United States Patent
Benson et al.

(10) Patent No.: US 9,076,255 B2
(45) Date of Patent: Jul. 7, 2015

(54) METHOD AND SYSTEM FOR RECONSTRUCTION OF TOMOGRAPHIC IMAGES

(75) Inventors: Thomas Matthew Benson, Smyrna, GA (US); Bruno Kristiaan Bernard DeMan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 611 days.

(21) Appl. No.: 13/149,698

(22) Filed: May 31, 2011

(65) Prior Publication Data

US 2012/0308099 A1 Dec. 6, 2012

(51) Int. Cl.
*G06K 9/00* (2006.01)
*G06T 11/00* (2006.01)

(52) U.S. Cl.
CPC ......... *G06T 11/006* (2013.01); *G06T 2211/424* (2013.01); *G06T 2211/432* (2013.01)
USPC ........................................................ 382/128

(58) Field of Classification Search
USPC ................................................ 382/128–134
See application file for complete search history.

(56) References Cited

U.S. PATENT DOCUMENTS

| | | | |
|---|---|---|---|
| 6,862,335 B2 | 3/2005 | Samit et al. | |
| 7,298,813 B2 * | 11/2007 | Tsuyuki et al. | 378/8 |
| 7,653,229 B2 | 1/2010 | Kaufhold et al. | |
| 7,831,097 B2 | 11/2010 | Chen et al. | |
| 7,876,946 B2 | 1/2011 | Scholz et al. | |
| 7,876,973 B2 | 1/2011 | Fairbanks et al. | |
| 2004/0076265 A1 * | 4/2004 | Heuscher et al. | 378/210 |
| 2005/0135664 A1 * | 6/2005 | Kaufhold et al. | 382/131 |
| 2005/0249416 A1 * | 11/2005 | Leue et al. | 382/195 |
| 2006/0067457 A1 * | 3/2006 | Zamyatin et al. | 378/4 |
| 2006/0198490 A1 * | 9/2006 | Tsuyuki et al. | 378/8 |
| 2007/0076928 A1 * | 4/2007 | Claus et al. | 382/128 |
| 2007/0116343 A1 * | 5/2007 | Sauer et al. | 382/131 |
| 2008/0019474 A1 * | 1/2008 | Nakanishi et al. | 378/9 |
| 2009/0010380 A1 * | 1/2009 | Gotoh | 378/5 |
| 2009/0028288 A1 * | 1/2009 | Horiuchi et al. | 378/4 |
| 2009/0110139 A1 * | 4/2009 | Noshi et al. | 378/4 |
| 2010/0011268 A1 | 1/2010 | Sinop et al. | |
| 2011/0075905 A1 * | 3/2011 | Noshi et al. | 382/131 |

* cited by examiner

*Primary Examiner* — Alex Liew
(74) *Attorney, Agent, or Firm* — Fletcher Yoder, P.C.

(57) ABSTRACT

Approaches are described for addressing artifacts associated with iterative reconstruction of image data acquired using a cone-beam CT system. Such approaches include, but are not limited to, the use of asymmetric regularization during iterative reconstruction, the modulation of regularization strength for certain voxels, the modification of statistical weights, and/or the generation and use of synthesized data.

14 Claims, 10 Drawing Sheets

METHOD AND SYSTEM FOR RECONSTRUCTION OF TOMOGRAPHIC IMAGES

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of X-rays through the target volume, to acquire image data and to construct tomographic images (e.g., three-dimensional representations of the interior of the human body or of other imaged structures). However, various physical limitations or constraints on acquisition may result in artifacts or other imperfections in the reconstructed image.

For example, third-generation cone-beam CT may suffer from cone-beam artifacts, particularly in the case of axial (circular) scan trajectories. These artifacts may arise from a variety of causes, such as truncation of data in the Z-direction (i.e., in the direction corresponding to the axis about which the X-ray source rotates about the patient), mishandled data, and/or missing frequencies. It is desirable to reduce or eliminate artifacts attributable to such causes in a cone-beam CT system, such as may be used to acquire axial or other data.

BRIEF DESCRIPTION

In one embodiment, a method is provided for processing tomographic image data. In accordance with this method a plurality of voxels are reconstructed from a set of scan data. At least some of the plurality of voxels are asymmetrically regularized. The asymmetric regularization of each respective voxel is based at least in part on adjacent voxels to the respective voxel. Less weight is given to adjacent voxels further from a mid-plane of a detector used to acquire the set of scan data. A final image is generated when iterative processing of the plurality of voxels or the set of updated voxels is determined to be complete. Corresponding computer-readable media and system embodiments are also provided.

In a further embodiment, a method is provided for processing tomographic image data. In accordance with this method a plurality of voxels is reconstructed from a set of scan data. A respective regularization strength is derived for each voxel based on the amount of projection data available for the respective voxel. The plurality of voxels are regularized based on a model prior and the respective regularization strength for each voxel. The regularization strength controls the strength of the model prior in regularizing the respective voxel. A final image is generated when iterative processing of the plurality of voxels is determined to be complete. Corresponding computer-readable media and system embodiments are also provided.

In another embodiment, a method is provided for processing tomographic image data. In accordance with this method a plurality of projection rays are acquired during a CT scan. A respective proportional weight is generated for one or more projection rays that passes outside a reconstruction volume. The plurality of projections rays are reconstructed to generate a plurality of reconstructed voxels. The one or more projection rays that pass outside the reconstruction volume are weighted during reconstruction by the respective proportional weight. A final image is generated when iterative processing of the plurality of reconstructed voxels is determined to be complete. Corresponding computer-readable media and system embodiments are also provided.

In an additional embodiment, a method is provided for processing tomographic image data. In accordance with this method a plurality of projection rays are acquired during a CT scan. The plurality of projections rays are reconstructed to generate an initial volume. The initial volume or an intermediate processed volume is reprojected to generate one or more synthesized rays. The plurality of projection rays and the one or more synthesized rays are iteratively reconstructed to generate a final image. Corresponding computer-readable media and system embodiments are also provided.

BRIEF DESCRIPTION OF THE DRAWINGS

These and other features and aspects of embodiments of the present invention will become better understood when the following detailed description is read with reference to the accompanying drawings in which like, characters represent like parts throughout the drawings, wherein.

DETAILED DESCRIPTION

Embodiments disclosed herein provide algorithms for the reconstruction of images from data collected using cone-beam computed tomography (CT). The algorithms address artifacts attributable to one or more of truncation of data in the z-direction, mishandled data due to incorrect data redundancy weighting, and/or missing frequency data. In accordance with certain embodiments, approaches are described for reconstructing image data, such as axial or helical scan data, in instances where some view data may be missing, such as in instances where there is data truncation. The present approaches may be suitable for use in an iterative reconstruction approach, such as a model-based iterative reconstruction (MBIR) approach.

The approaches disclosed herein may be suitable for use with a range of tomographic reconstruction systems. To facilitate explanation, the present disclosure will primarily discuss reconstruction approaches in the context of a CT system. However, it should be understood that the following discussion may also be applicable to other tomographic reconstruction systems.

Figure 1:
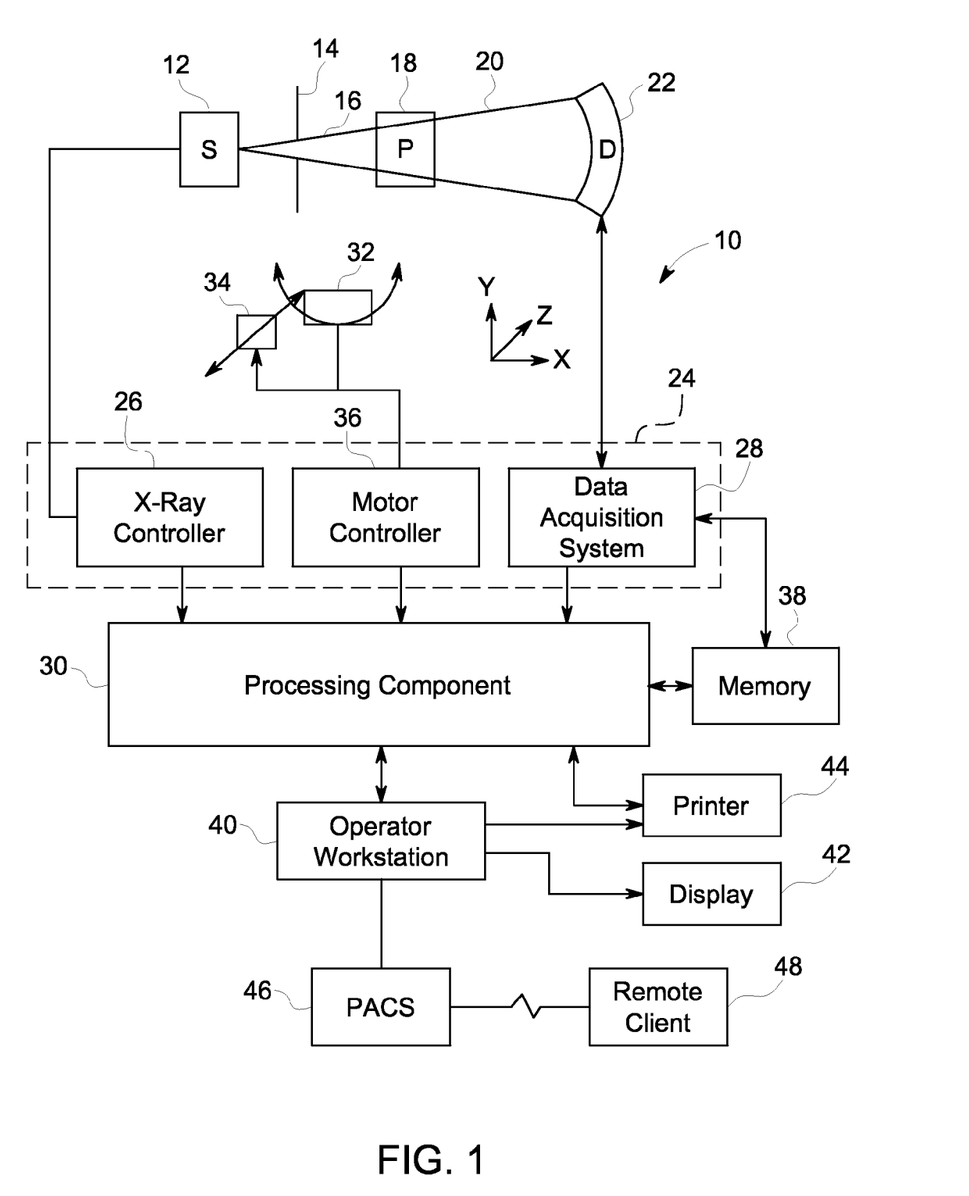
FIG. 1 is a diagrammatical view of a CT imaging system for use in producing images in accordance with aspects of the present disclosure.

With this in mind, an example of a computed tomography (CT) imaging system 10 designed to acquire X-ray attenuation data at a variety of views around a patient and suitable for tomographic reconstruction is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated to be a cone-shaped beam, i.e., a cone-beam, that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x, y-plane, about the patient. It should be noted that the rotational subsystem 32 might include a gantry upon which the respective X-ray emission and detection component's are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

As noted above, the reconstruction of images from data acquired by an imaging system, such as the depicted CT imaging system 10, may be subject to various limitations that may result in artifacts or other imperfections in the generated images. In particular, in an axial (i.e., circular) cone-beam acquisition, certain of the voxels in the image volume will always be in the X-ray beam during the axial spin (such as those voxels near the mid-plane i.e., plane in which the X-ray focal spot moves) while other voxels are illuminated in certain of the views during the axial spin but not in others. For example, due to the narrow portion of the X-ray cone being closer to the X-ray source 12, (that is, the cone expands or diverges as distance from the source increases) a narrow segment of voxels near the X-ray 12 source may be illuminated while those voxels furthest from the source are fully or mostly illuminated due to being near the wide base of the cone. However, as the X-ray source is rotated axially about the volume, the portions of the volume that are near and far from the X-ray source 12 will also rotate, with the result being that the extent of X-ray illumination a voxel receives will be inversely proportional to the distance of the voxel from the mid-plane of focal spot rotation. As a result, there is less data available with respect to the edges of the X-ray cone in the z-direction in an axial scan than for those voxels nearer the mid-plane of the cone in the z-direction. This data truncation in the z-direction may prevent the reconstruction of good quality images outside that portion of the volume which is always projected onto the detector during an axial scan.

For example, voxels close to the edge slices of the detector 22 may have very limited data, i.e., even less than 180 degree of data, typically the minimum requirement for useful tomographic reconstruction. Therefore, extrapolation and image domain corrections are typically used to suppress artifacts. Traditionally, virtual rows may be extrapolated from existing real (i.e., observed or measured) data, which makes the detector virtually bigger. However, this method only works perfectly for objects that are uniform in z, i.e., in the direction of the extrapolation. In practice, extrapolation tends to introduce errors that result in streak artifacts.

Figure 2:
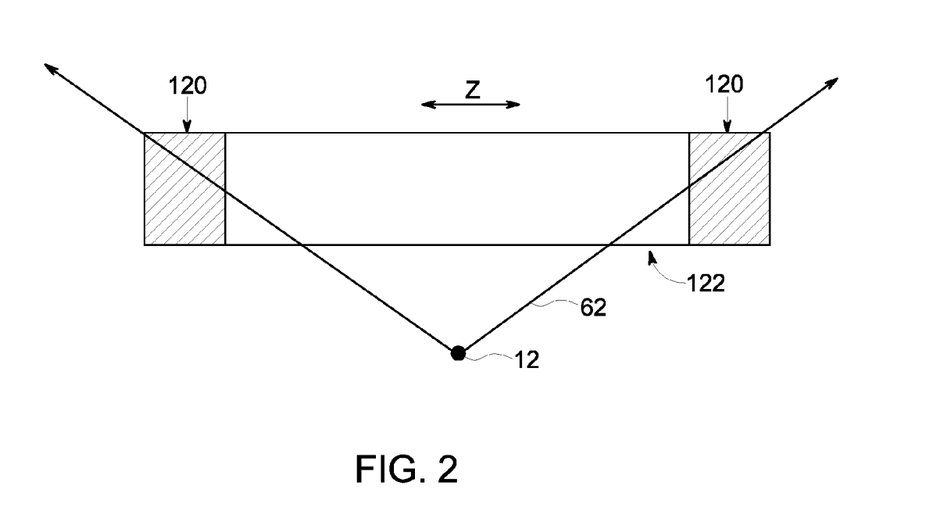
FIG. 2 depicts an example of data truncation in the z-direction, in accordance with aspects of the present disclosure.

A visual depiction of how data truncation occurs in the z-direction is provided by FIG. 2. The end portions, i.e., truncation regions 120, on either end of the sampled image volume 122 represent regions where data truncation may occur such that the scan data is incomplete (i.e., less than 180 degrees of data) and/or where scan data is extrapolated or otherwise padded to address this absence of complete image data. As will be appreciated, this padding of data may occur for different types of acquisition protocols, such as either axial scans or helical scans.

In a non-iterative reconstruction, it is not required to reconstruct image data in the truncation regions 120. However, in an iterative reconstruction approach, the data in the truncation regions 120 are needed to compute the forward projections along the depicted rays 62 because these rays do traverse the truncation regions 120. However, because the truncation regions 120 are outside of the typical reconstruction volume 122 and typically are regions where scan data is incomplete (i.e., less than 180 degrees of data), artifacts may be introduced by the incompleteness of the data in the truncation regions 120 or by means addressing that incompleteness, such as extrapolation of the measured data at the detector boundary. By way of example, in one embodiment where model based iterative reconstruction (MBIR) is employed, missing data in the truncation region 120 may be estimated to solve for the image outside of the standard reconstruction volume, i.e., in the truncation regions 120 (e.g., outside of 40 mm for a VCT/HD system).

In addition, in some instances where a cone-beam axial scan is employed, certain frequency information may be missing for a given voxel. For example, even inside the 360 degree region generated by a circular (i.e., axial) scan, there may be some missing frequencies, particularly along the z-direction. The amount of missing frequencies will increase with distance from the mid-plane or central-plane (i.e., the plane in which the x-ray focal spot moves). The missing frequencies may result in cone-beam artifacts in the outer slices.

Some or all of the above-noted issues may be addressed by the approaches discussed herein. By way of introducing certain aspects of these approaches, a brief review of system geometry of a cone-beam system and the consequent available data in the Fourier domain is provided. As noted above, in an axial scan of a cone-beam CT scanner, not all voxels are within the X-ray cone from all view angles due to the limited z-extent of the detector. However each voxel will be in the X-ray beam for a certain view range, with the respective view range growing more limited the farther the voxel is from the mid-plane. For example, turning to FIG. 3, for an axial full-scan (i.e., a 360 degree axial rotation of the X-ray source and detector), region 100 is seen for the full 360 angular range. That is, for an axial full-scan region 100 provides 360 degrees of data. For an axial half-scan (i.e., a 180 degree+α rotation of the X-ray source and detector), region 100 yields at least 180 degree of data (but less than 360 degrees of data). For region 100, there is no z-truncation problem, though there may still be issues related to missing frequencies and/or mishandled data.

Figure 3:
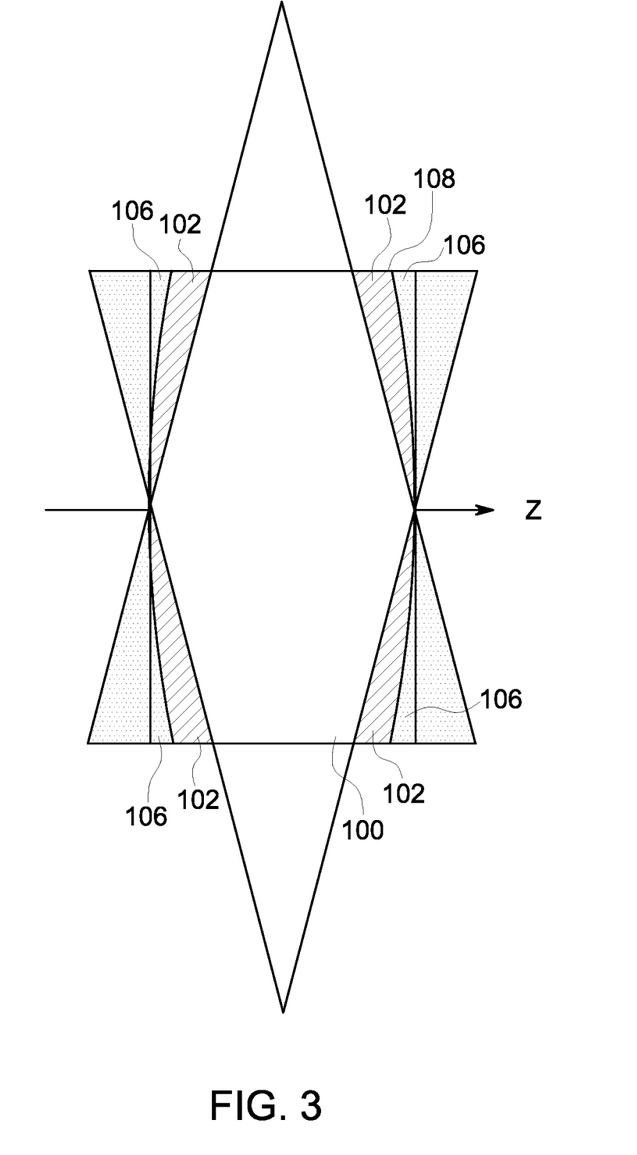
FIG. 3 depicts a representation of available data in the Fourier domain obtained using a cone-beat CT system, in accordance with aspects of the present disclosure.

For region 102, an axial full-scan provides less than 360 degrees of data but more than 180 degrees of data. For an axial half-scan, region 102 provides less than 180 degrees of data. Thus, there may be substantial missing data in region 102 in the half-scan scenario and, even in the full-scan scenario the data is less than complete. Region 106 represents those voxels for which less than 180 degrees of data is measured regardless of whether a full-scan or a partial or half-scan is performed. Region 106 is the region where primary X-rays pass through and, near the boundaries of region 106, only very minimal measured data (a few degrees) is available. As a result, image quality close to the edge slices will typically be poor, with strong streaks observed along the tangent direction.

FIG. 3 also depicts the standard cylindrical region, denoted by line 108, corresponding to the nominal scan coverage. For example in the case of an N mm system, this would be a cylinder with diameter equal to the field-of-view and length of N mm. It is slightly larger than the 180-degree region (i.e., region 100 combined with regions 102) and therefore the corner regions may suffer from z-truncation (less than 180 degrees worth of data).

As noted above, data truncation in the z-direction may be a particular problem for iterative reconstruction approaches, such as model-based iterative reconstruction. In such an iterative approach, for every iteration a current estimate of the image (or a subset of it) is run through a forward model, resulting in an estimated dataset (or a subset of it). The estimated data set is compared with the measured dataset, and the image is updated based on the residual discrepancy, i.e., the difference between what was expected and what was observed. In some cases the discrepancy between the measured and estimated data is weighted based on the estimated statistical reliability of a measurement. Approaches where a weighting is used based on some estimate of the statistical reliability of the measurements may be described as statistical iterative reconstruction approaches.

Typically iterative processing continues until a specified completion criterion is met which signifies that no additional iterations are to be performed. In certain embodiments, the completion criterion may be a predetermined number of iterations, such as an empirically determined number of iterations corresponding to a desired degree of image enhancement. In other embodiments, the completion criterion may generally reflect the degree of convergence attained between the calculated and measured images or image characteristics. That is, the completion criterion may be based upon a desired degree of convergence between the calculated and measured images or image characteristics such that the degree of similarity is deemed sufficient and/or such that further iterations will not further converge the calculated and measured images or image characteristics to an appreciable or desired extent. In certain implementations, the completion criterion may be implemented as a cost function, such as a statistically weighted cost function, that may be optimized to assess convergence.

With the foregoing discussion of iterative reconstruction and of data deficiencies, the following discussion describes various approaches that may be used to address artifacts related to such data deficiencies. For example, as noted above, in an iterative reconstruction approach to voxel reconstruction, model priors may be imposed to help regularize voxels based on prior knowledge or expectations with regard to the reconstruction. Such regularization may be based in part on the values observed at nearby or adjacent voxels. However, as noted above, observed data may be sparse near the detector edges, particularly in the z-direction. Thus, where data is missing or extrapolated near the edges of the detector, the usefulness of such edge pixels in the regularization process associated with iterative reconstruction may be limited.

For example, consider a regularization cost for the jth voxel incorporating some neighborhood of j ($N_j$) given by:

$$\beta_j \sum_{k \in N_j} \sigma_k b_{jk} \Box [x]_j, x_k [ \qquad (1)$$

where $\beta_j$ and $\sigma_k$ represent regularization strengths ($\beta_j$) for k neighboring voxels ($\sigma_k$), $\Box [x]_j, x_k [$ is some potential function, and $b_{jk}$ represents the directional weights. The inclusion of the spatially dependent strength parameters allows consideration of the directional weights in a normalized sense. In a typical iterative reconstruction approach the directional weights will be symmetric such that $b_{jk}=b_{kj}$ and these directional weights will also often be spatially invariant (i.e., the same set of b values are used for all voxels).

However, in a present implementation the directional weights in or near the data truncation region 120 associated with the detector edges may be modified so as to achieve an asymmetric regularization effect. In a general sense, larger weights are assigned to voxels in a direction where the data is believed to be reliable. That is asymmetric regularization modifies this structure such that $b_{jk}$ differs from (i.e., ≠) $b_{kj}$. In this manner, a good or trusted region of the data may be given a larger weight than other regions of the data that are not believed to be as accurate. By way of example, regularization can be enforced in the z-direction toward the truncation region, but the regularization strength may be relatively lessened from the truncation region toward the standard region. This may prevent artifacts in the truncation region from propagating into the primary region. For example, asymmetric regularization may reduce artifacts in the edge slices (such as artifacts attributable to extrapolation during analytic reconstruction) that may otherwise be reinforced by nearby slices in the truncation region, thereby improving the uniformity of the reconstruction. In particular, asymmetric regularization does not necessarily assume any particular nature of the artifacts in the truncation region, but rather only that the image quality in the truncation region is likely worse.

For example, in one embodiment $b_{jk}$ may be reduced (such as to zero) when j is a voxel in the standard reconstruction volume and k is a voxel in the padding region, i.e., the region where data is extrapolated. In a more general case, a vector can be computed pointing from the center of a voxel toward a region in space with more complete data available. Weighting along the vector can then be increased toward that more complete region. Equivalently, weighting can be decreased as distance from the complete region increases. In many cases, the neighborhood will all have the same level of completeness, in which case no change is necessary. That is, where there is no difference in completeness in the neighboring region, no weighting may be employed.

Figure 4:
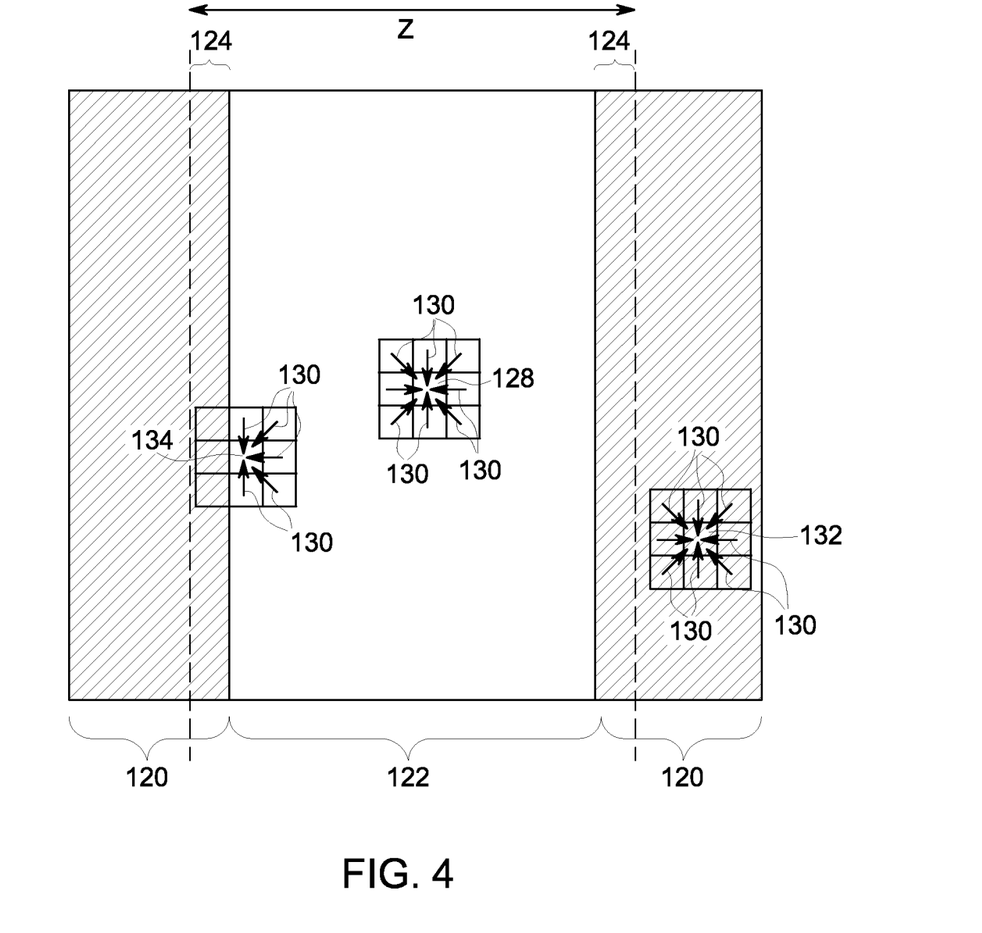
FIG. 4 depicts examples of asymmetric regularization for different regions that vary with respect to the data completeness of the neighboring region, in accordance with aspects of the present disclosure.

Turning now to FIG. 4, a visual depiction of an example of asymmetric regularization is provided. In this example, two regions in the data space are depicted: truncation regions 120 where less data is incomplete and/or extrapolated in the z-direction and a complete data region 122 where the data is not truncated in the z-direction. In this example, a buffer region 124 is also depicted as a subset of the respective truncation regions 120 that is proximate to the complete data region 122. In certain implementations, such buffer regions 124 may be employed where applying asymmetric weighting throughout the truncation regions 120 would slow convergence in the iterative reconstruction process to unacceptable levels. In particular, in these implementations, the asymmetric regularization process discussed herein may be restricted to the buffer region 124. The use of a buffer region 124 and/or the size of such buffer regions 124 may, therefore, be used to manage the trade-off between convergence speed and artifact level.

In the depicted example, three voxels are depicted along with their respective neighboring voxels. With respect to the first depicted voxel 128, this voxel 128 is surrounded by voxels for which data is complete and, further, is near the scan plane, so regularization may take into account contributions from all neighboring voxels (as depicted by the arrows 130). In the depicted example, the second voxel 132 is in the truncation region 120 but outside a defined buffer region 124 where asymmetric regularization is applied. In this instance, regularization may also include contributions from all neighboring voxels, as depicted by the arrows 130. Lastly, the third voxel 134 is depicted in the truncation region 120 and in the defined buffer region 124 where asymmetric regularization is applied. In this instance, asymmetric weighting is applied so that more weight is given to those voxels nearer the scan plane and/or where complete data is present. In this example, this results in a larger relative weight being given to those voxels in the complete data region 122, which contribute to the regularization of the third voxel 134, as depicted by the arrows 130, and no or little weight being given to the neighboring voxels in the buffer region 124, as indicated by the absence of arrows. After weighting adjustments, the regularization coefficients (i.e., $b_{jk}$) may be normalized such that they sum to one for each voxel.

Figure 5:
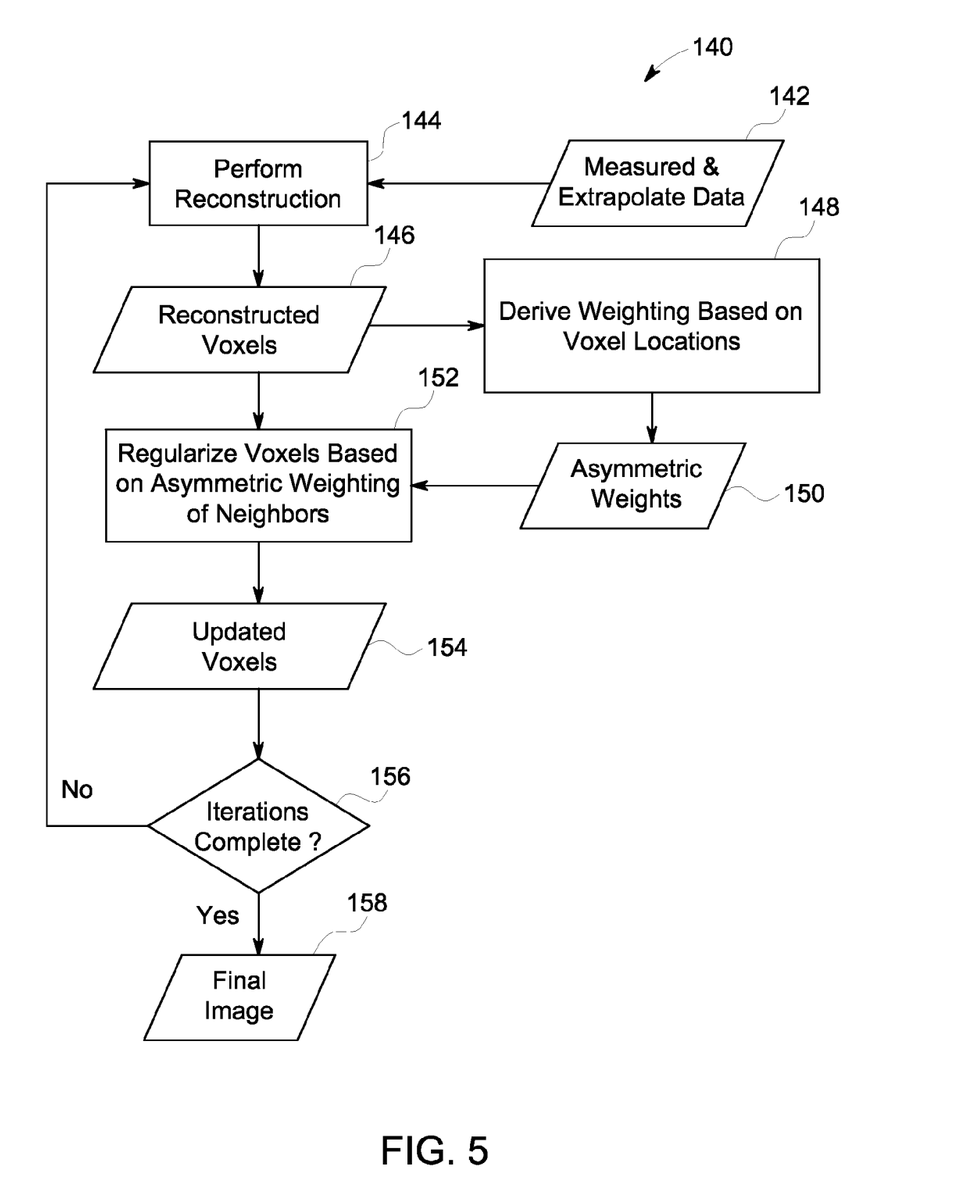
FIG. 5 depicts a flowchart describing one algorithm for implementing an asymmetric regularization implementation, in accordance with aspects of the present disclosure.

Turning to FIG. 5, a flowchart 140 of control logic is provided depicting steps for implementing one embodiment of an asymmetric regularization algorithm in the image domain. In accordance with the depicted embodiment, a set of image data 142, such as CT image data, is reconstructed (block 144) to generate a plurality of voxels 146. In some instances, the image data 142 represents not only measured data but also extrapolated or estimated data where measured data is unavailable, such as due to z-truncation. For some or all of the reconstructed voxels, a respective asymmetric weight 150 may be generated (block 148) based upon the location of the voxel, and the voxel neighbors, with respect to the expected reconstruction quality, as discussed above. That is, greater weight may be assigned to voxels in a direction where the data is believed to be complete or reliable as compared to the weights assigned to voxels in a direction where the data is believed to be less complete or reliable (such as in the direction where data is estimated or extrapolated).

Voxels subject to asymmetric weighting, such as voxels near the edge of the detector, may be regularized (block 152) at least partly based on the asymmetric weighting applied to the proximate (e.g., neighboring) voxels. As will be appreciated, regularization of the reconstructed voxels 146 may also be based on a model or other estimate reflecting expected values of the voxels, in accordance with iterative reconstruction approaches. The updated voxels 154 may be reconstructed once again if the iterative process is not complete, e.g., convergence has not been achieved (as determined at block 156). Alternatively, if iterative processing is complete, the updated voxels 154 may constitute a final image 158 for review by a user.

As discussed above with respect to asymmetric regularization, each voxel can have its own regularization strength, $\beta_j$. In cases where some voxels have more or less corresponding data available, it may be useful to modify this regularization strength based on the amount of data that is available. For example, in the context of a model-based iterative reconstruction (MBIR), the MBIR may be modified to boost the regularization strength for voxels with fewer than all views contributing to the updates.

One method for modifying regularization strength based on the amount of data that is available is based on the ratio of the "completeness" of the data in a 180 degree context. A voxel will have complete data when it has 180 degrees or more of non-redundant contributing data. Thus, a ratio can be computed of the angles that are available for a particular voxel or voxels. For example, if 90 degrees of data is available with no redundancy, the corresponding ratio would be 90/180 or 1/2, meaning that the voxel in question would have 1/2 coverage. As discussed herein, this ratio, $r_c$, may be used to modify the regularization strength using, for example, factors of $[r_c]^k$ or of $[1/r_c]^k$ for some power k.

Another approach in the case of an axial full-scan is to compute the ratio of the total number of contributing views to the total number of acquired views to derive a corresponding ratio. Powers of this ratio or the inverse of this ratio could be used, as discussed above, to derive suitable weighting for a respective voxel.

For example, in one implementation provided in the context of MBIR, the number of contributing views is determined by counting the number of views with one or more non-zero elements in the system matrix column corresponding to a given voxel. For this example, the regularization is boosted by some function of $(N_v/N_c)$ where $N_v$ is the number of total views and $N_c$ is the number of contributing views. For the purpose of explanation, boosting by $(N_v/N_c)^1$ may be described herein as $R_1$ boosting, boosting by $(N_v/N_c)^{1/4}$ as $R_{1/4}$ boosting, and so forth.

In such an embodiment, regularization boosting (i.e., when $[1/r_c]^k$ is employed) increases strength of the regularization, i.e., the impact of the prior on the edge slices, thereby providing additional smoothing. Conversely, regularization deflation (i.e., when $[r_c]^k$ is employed) decreases the impact of the prior on the edge slices, such as where more texture, i.e., less smoothing, is desired. Regularization boosting may help prevent artifacts in the truncation region where little or sparse data may be available and, in certain embodiments, may be limited to the truncation region.

As will be appreciated, in certain implementations, regularization boosting may facilitate the introduction of artifacts from the truncation region into the imaging volume. To prevent or reduce such artifact introduction, regularization boosting may be employed with the asymmetric regularization approaches discussed herein for preventing artifacts from propagating into the edge slices from the truncation region.

Figure 6:
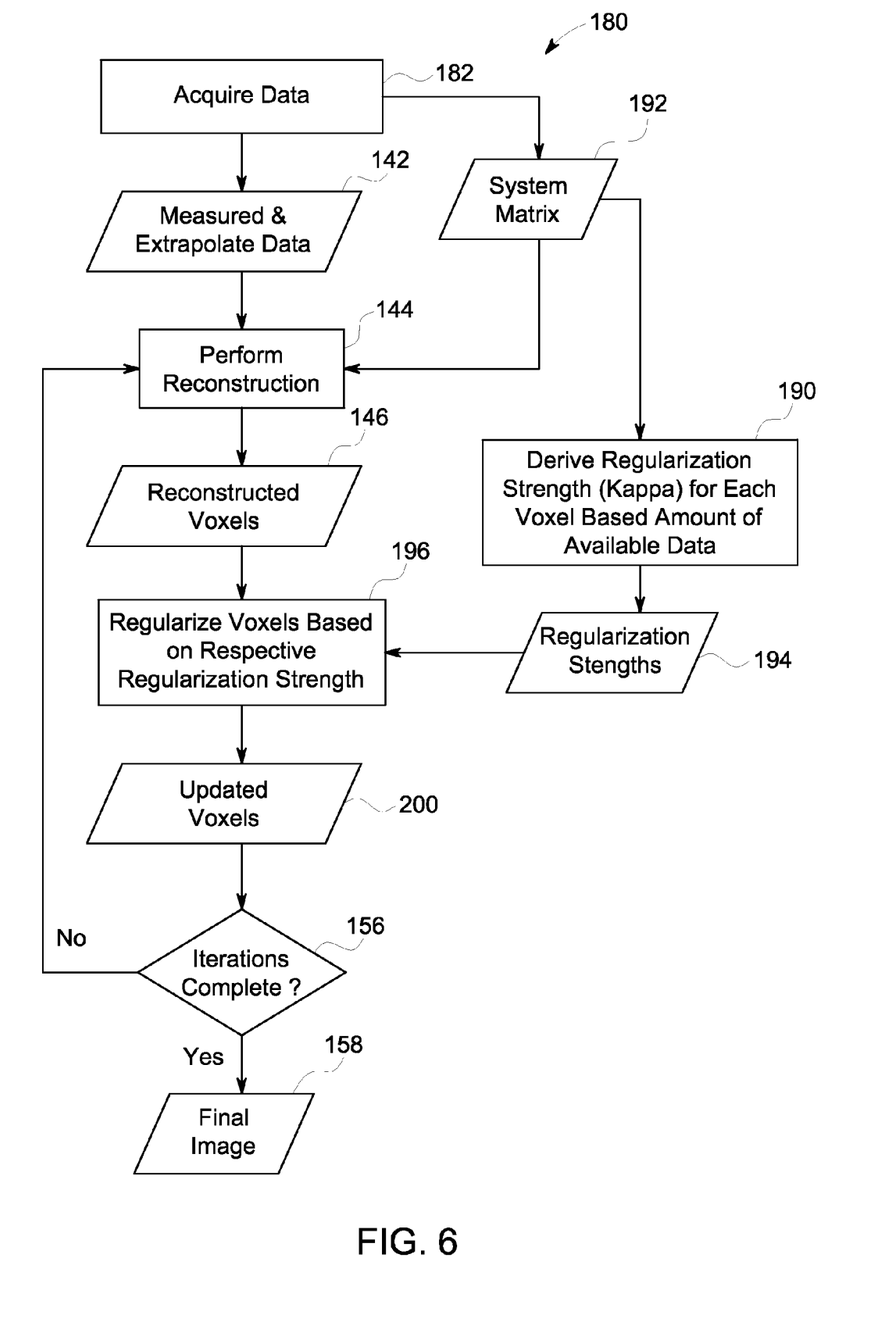
FIG. 6 depicts a flowchart describing one algorithm for implementing a regularization strength modification, in accordance with aspects of the present disclosure.

Turning to FIG. 6, a flowchart 180 of control logic is provided depicting steps for implementing one embodiment of a regularization strength modulation algorithm. In accordance with the depicted embodiment, a set of image data 142, such as CT image data, is acquired (block 182). The measured and extrapolated data 142 may be reconstructed (block 144) to generate a plurality of voxels 146. A system matrix 192 may be employed in the reconstruction that relates the response at the various detector elements to the voxels in the field of view. In the depicted embodiment, the system matrix 192 may be used to derive (block 190) a regularization strength 194 for each voxel (or each voxel in the truncation region) based on the amount of available data. For example, in one implementation the number of contributing views ($N_c$) is determined by counting the number of views with one or more non-zero elements in the system matrix column corresponding to a given voxel. The number of contributing views over the total number of views for a voxel may provide a ratio for that voxel that may be used in deriving the regularization strength 194 for the respective voxel.

Some or all of the reconstructed voxels 146, (such as voxels near the edge of the detector or in the truncation region), may be regularized (block 196) at least partly based on the derived regularization strengths 194. As will be appreciated, regularization of the reconstructed voxels 146 may also be based on a model or other estimate reflecting expected values of the voxels, in accordance with iterative reconstruction approaches. The updated voxels 200 may be reconstructed once again if the iterative process is not complete, e.g., convergence has not been achieved (as determined at block 156). Alternatively, if iterative processing is complete, the updated voxels 200 may constitute a final image 158 for review by a user.

In further embodiments, statistical weighting modifications (e.g., z-downweighting, as discussed below) may be employed to reduce artifacts attributable to limited data in a CT iterative reconstruction context. For example, for rays passing outside of the reconstruction volume in z, MBIR will need to form some approximation of the imaged object outside of the standard imaging volume in order to compute the forward projection along the rays traversing the truncation region. Since the truncation region will typically include incomplete data compared to the standard imaging volume, and hence will be less accurate than the standard imaging volume, the projection rays partially traversing the truncation region will tend to correspond to larger errors. Thus, it may be beneficial to reduce the weight associated with those rays.

In such approaches, weights associated with each ray may be based upon expected error due to the geometric sampling. In general, if the ray passes through a region of the object for which more or less error is expected than the estimated variance would indicate, the weights may be modified accordingly.

In one instance, error in the padding region for iterative reconstruction may be expected because the region is poorly sampled. In that case, the rays passing through that region may be downweighted. In one implementation, the ratio of the distance (i.e., ratio d, in the padding region (i.e., the truncation region) to the total distance through the object can be computed. The weights can then be modified using some function of d, e.g. $d^k$, for some power k. For example, the ratio d of the path length of the ray traversing the standard imaging volume relative to the extended imaging volume (standard imaging volume plus truncation region) may be calculated. Then, for example, the associated rays may be weighted by $d^k$ for some power k. As a result, rays that pass through the truncation region may be downweighted (i.e., weighted less) in the z-direction while rays that do not pass through the truncation region are not downweighted. In certain implementations, the regularization values may be reduced toward the edge slices. In such implementations, regularization boosting, as discussed above, may be used to counteract the effect. In general, z-downweighting in this manner may offer improvements, such as with respect to lower frequency shading and/or brightening artifacts.

Figure 7:
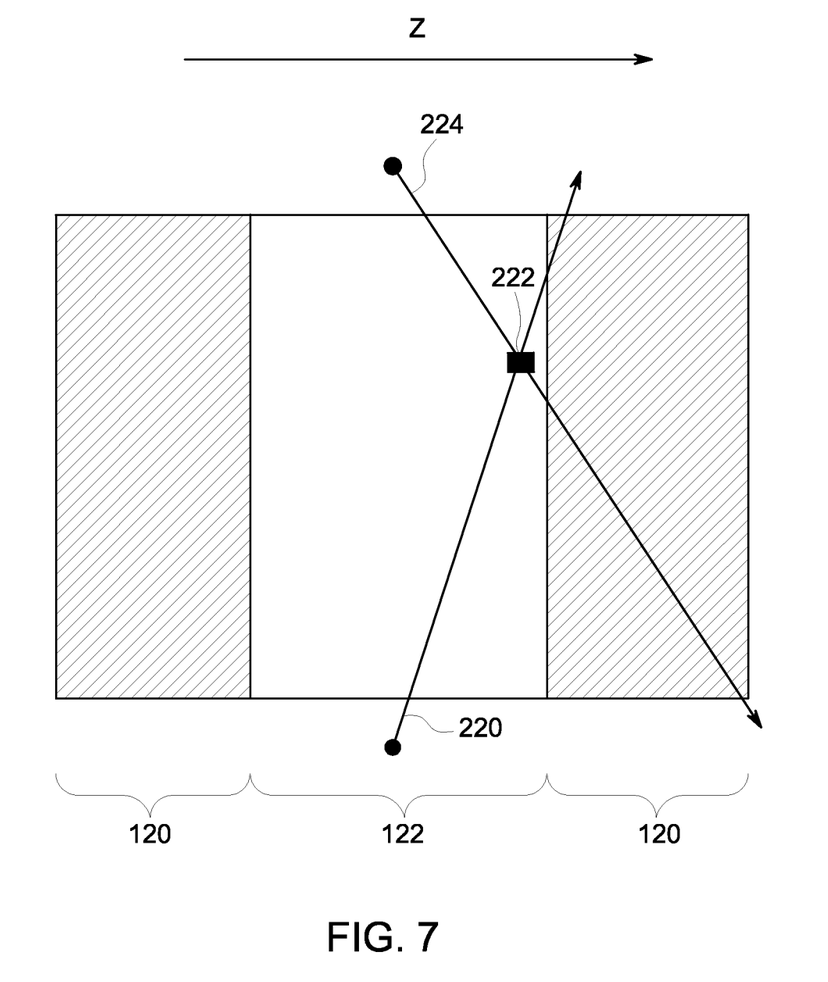
FIG. 7 depicts a visual example of different ray path lengths through a data truncation region, in accordance with aspects of the present disclosure.

By way of example, and turning to FIG. 7, both first view 220 and second view 224 (which is 180 degrees from first view 220) contribute to voxel 222. However, first view 220 is likely more reliable due to its smaller path length through truncation region 120. Thus, in this example, the rays associated with both first view 220 and second view 224 might be downweighted (as they both at least partially pass through the truncation region), however the ray associated with the first view 220 may be downweighted less than the ray associated with second view 224. For example the statistical weighting of each ray may be downweighted in proportion to their respective length or traversal through the truncation region 120, e.g., the padded region. In addition, as noted above, the regularization strength for voxel 222 may be adjusted to maintain desired noise levels.

Similarly, in instances a portion of an image may be known to be good or information may be available about the composition or construction of the imaged area (e.g., due to a prior information). In such a case, the weights of the associated rays could be increased.

Figure 8:
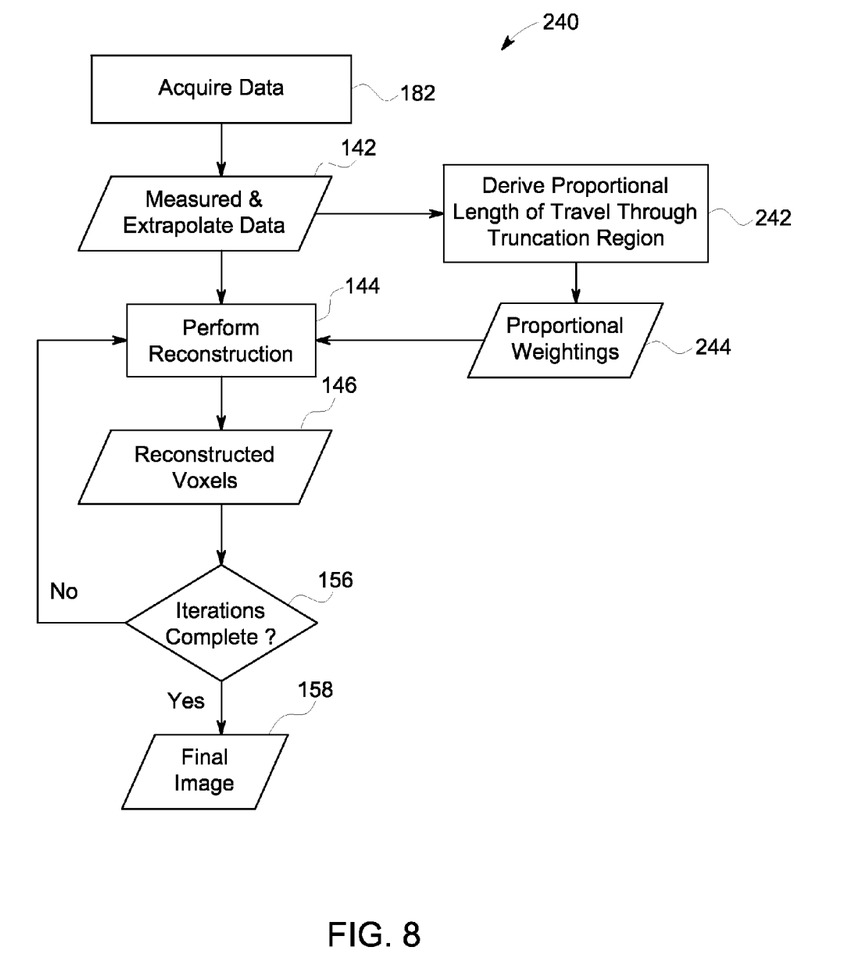
FIG. 8 depicts a flowchart describing one algorithm for implementing statistical weight modifications, in accordance with aspects of the present disclosure.

Turning to FIG. 8, a flowchart 240 of control logic is provided depicting steps for implementing one embodiment of a statistical weighting modification algorithm. In accordance with the depicted embodiment, a set of image data 142, such as CT image data, is acquired (block 182). The measured and extrapolated data 142 may be reconstructed (block 144) to generate a plurality of voxels 146. As part of the reconstruction process, the rays contributing to each respective voxel may be weighted based on geometric sampling factors. For example, in the depicted embodiment, the proportional distance traveled by a ray through an extrapolated or otherwise poorly sampled region may be derived (block 242) and proportional weights 244 for these respective rays generated. The respective rays may then be weighted based on these proportional weights 244 as part of the reconstruction process. As a result, those rays which travel a greater distance through regions where more error is expected (e.g., the truncation region 120) may be weighted less than other rays that travel less distance (or not at all) through such error prone regions. Some or all of the reconstructed voxels 146, may be reconstructed once again if the iterative process is not complete, e.g., convergence has not been achieved (as determined at block 156). Alternatively, if iterative processing is complete, the reconstructed voxels 146 may constitute a final image 158 for review by a user.

In yet another embodiment, limited data issues impacting reconstruction quality near the edge of a volume in the z-direction may be handled by data synthesis. In particular, in one approach data may be synthesized or extrapolated using an initial reconstruction, such as may be generated using a standard analytical algorithm. In such an approach, the data may be synthesized via reprojection of this initial volume.

Figure 9:
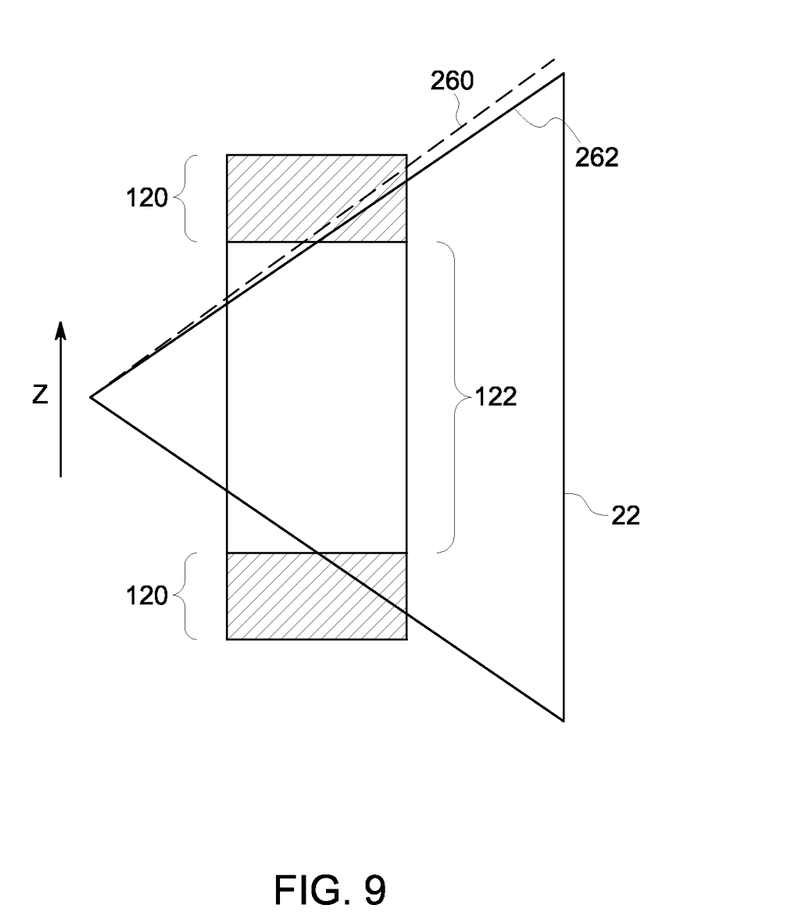
FIG. 9 depicts a visual example of a synthesized ray generated for unacquired image data, in accordance with aspects of the present disclosure.

For example, in one implementation data may be reprojected along unsampled or unacquired rays corresponding to additional detector rows in the projection domain. Turning to FIG. 9, an example of this approach is depicted in which a synthesized ray 260 is generated that corresponds to rows beyond those that are physically present on the detector 22. In one such implementation, only the standard image volume is reprojected to generate the synthesized rays 260, i.e., the truncation, or padded, region 120 is not reprojected. That is, for the synthesized rays 260, the truncation region 120 is assumed to be zero. Conversely, for the real rays (e.g., ray 262), i.e., measured rays, incident on the detector 22, the truncation region 120 is accounted for as the measured ray 262 traversed that portion of the object or subject. The zero assumption with respect to the synthesized rays 260 may be enforced when performing forward and backprojections that correspond to the synthesized rays 260 and the truncation region 120.

By way of example, in one such implementation, when calculating the error sinogram (i.e., the difference of the acquired and synthesized projection data set and the reprojection of the current image volume estimate), the reprojector assumes for the synthesized rays 260 that the truncation region voxels are zero whereas for the measured rays 262 the actual potentially non-zero (e.g., extrapolated) values are employed. Similarly, when backprojecting, updates are not accumulated corresponding to the synthesized rays 260 into the truncation region 120.

In certain approaches, statistical weighting values are assigned to the synthesized rays 260. This may be done in a number of ways and may be similar to the statistical weighting modifications above. For example, a simple $0^{th}$-order extrapolation of the regular weights may be performed (i.e., copy the nearest detector row of real weightings into the synthesized row) followed by the z-downweighting, as described above. The synthesized data can be further downweighted by a simple scaling factor (e.g., 0.5 or 0.25) to assign less weight to the synthesized data under the assumption that there will be error associated with the data synthesis.

Figure 10:
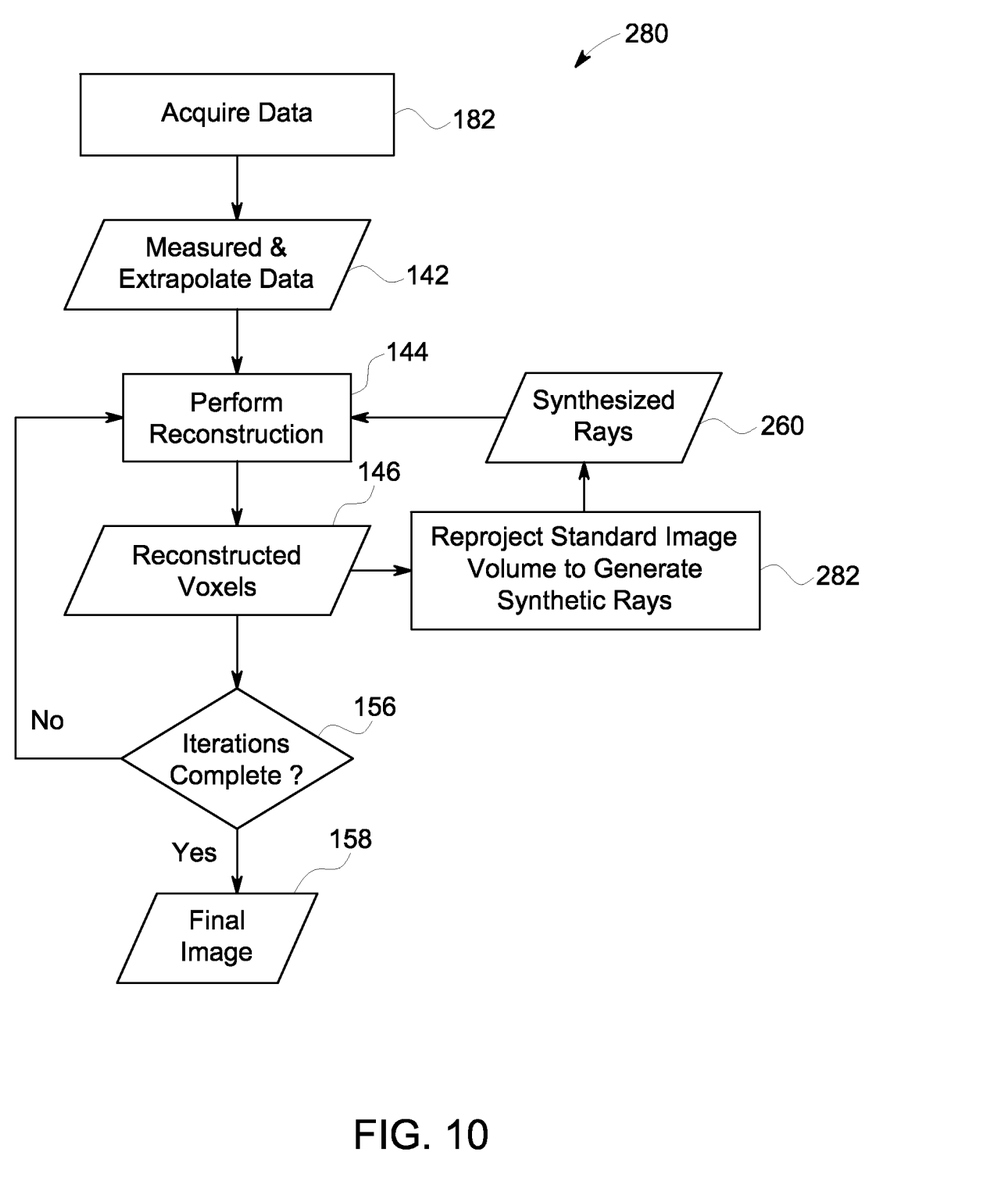
FIG. 10 depicts a flowchart describing one algorithm for generating synthesized rays, in accordance with aspects of the present disclosure.

Turning to FIG. 10, a flowchart 280 of control logic is provided depicting steps for implementing one embodiment of a data synthesizing algorithm. In accordance with the depicted embodiment, a set of image data 142, such as CT image data, is acquired (block 182). The measured and extrapolated data 142 may be reconstructed (block 144) to generate a plurality of voxels 146. The voxels corresponding to the standard image volume (i.e., the non-truncated data regions) may be reprojected (block 282) to generate one or more synthesized rays 260 corresponding to additional detector rows in the projection domain, i.e., to detector rows that do not physically exist. The synthesized rays 260 may be used in subsequent reconstructions. Some or all of the reconstructed voxels 146, may be reconstructed once again if the iterative process is not complete, e.g., convergence has not been achieved (as determined at block 156). Alternatively, if iterative processing is complete, the reconstructed voxels 146 may constitute a final image 158 for review by a user.

Technical effects of the invention can include the use of asymmetric regularization during an iterative reconstruction process. Other technical effects can include the modulation of regularization strength for certain voxels during an iterative reconstruction process. Further technical effects can include the modulation of regularization strength for certain voxels during an iterative reconstruction process. Additional technical effects can include the generation and use of synthesized data during an iterative reconstruction process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for processing tomographic image data, comprising:
   reconstructing a plurality of voxels from a set of scan data;
   asymmetrically regularizing at least some of the plurality of voxels, wherein the asymmetric regularization of each respective voxel is based at least in part on adjacent voxels to the respective voxel, wherein less weight is given to adjacent voxels further from a mid-plane of a detector used to acquire the set of scan data, wherein the mid-plane defines the plane in which an X-ray source is rotated about a scan axis; and
   generating a final image when iterative reconstructing of the plurality of voxels or the set of updated voxels is determined to be complete.

2. The method of claim 1, wherein asymmetrically regularizing the plurality of voxels comprises deriving a regularization strength for each voxel based at least in part on a directional weight applied to the respective adjacent voxels, wherein the directional weights are asymmetric at least for voxels at an edge of the detector.

3. The method of claim 2, wherein the directional weights that are asymmetric apply less or no weight to voxels that are in a truncation region associated with the set of scan data than to voxels that are not in the truncation region.

4. The method of claim 2, wherein the directional weights that are asymmetric assign a greater weight to voxels nearer the scan plane and a lesser weight to voxels nearer the truncation region.

5. The method of claim 1, wherein the voxels subject to asymmetric regularization are limited to a buffer region corresponding to the edge of the detector.

6. A method for processing tomographic image data, comprising:
   reconstructing a plurality of voxels from a set of scan data;
   deriving a respective regularization strength for each voxel based on the amount of image data available for the respective voxel, wherein the respective regularization strength for a respective voxel is derived using a ratio that comprises the number of contributing views for the respective voxel divided by the number of acquired views, wherein the number of contributing views is determined by counting the number of views with one or more non-zero elements in a column corresponding to a given voxel within a system matrix that relates the response at each detector element to the voxels in the field of view;
   regularizing the plurality of voxels based on a model prior and the respective regularization strength for each voxel, wherein the regularization strength controls the strength of the model prior in regularizing the respective voxel and wherein the model prior includes expectations regarding the reconstruction; and
   generating a final image when iterative reconstructing of the plurality of voxels is determined to be complete.

7. The method of claim 6, wherein the ratio describes the completeness of the data contributing to the voxel.

8. The method of claim 7, wherein the ratio comprises the non-redundant angular coverage for the respective voxel divided by 180 degrees.

9. A method for processing tomographic image data, comprising:
   acquiring a plurality of projection rays during a CT scan;
   generating a respective proportional weight for one or more projection rays that passes outside a reconstruction volume, wherein the respective proportional weight is generated based on the proportion of distance traveled by the respective projection ray through a padding region relative to the total distance traveled by the respective projection ray through both the standard reconstruction volume and the padding region, wherein the padding region comprises a region where data is incomplete;
   reconstructing the plurality of projections rays to generate a plurality of reconstructed voxels, wherein the one or more projection rays that pass outside the reconstruction volume are weighted during reconstruction by the respective proportional weight; and
   generating a final image when iterative reconstructing of the plurality of reconstructed voxels is determined to be complete.

10. The method of claim 9, wherein the one or more projection rays that pass outside the reconstruction volume pass through a data truncation region wherein the plurality of projections rays are incomplete.

11. The method of claim 9, wherein the one or more projection rays that pass outside the reconstruction volume are downweighted during reconstruction.

12. The method of claim 9, wherein the respective proportional weights account for prior information of the composition or construction of an imaged area.

13. One or more non-transitory computer-readable media, encoding one or more routines which, when executed by a processor, cause the processor to perform acts comprising:
   reconstructing a plurality of voxels from a set of scan data;
   asymmetrically regularizing at least some of the plurality of voxels, wherein the asymmetric regularization of each respective voxel is based at least in part on adjacent voxels to the respective voxel, wherein less weight is given to adjacent voxels further from a mid-plane of a detector used to acquire the set of scan data, wherein the mid-plane defines the plane in which an X-ray source is rotated about a scan axis; and generating a final image when iterative reconstructing of the plurality of voxels or the set of updated voxels is determined to be complete.

14. An image processing system, comprising:

a memory storing one or more routines; and a processing component configured to execute the one or more routines stored in the memory, wherein the one or more routines, when executed by the processing component:

reconstruct a plurality of voxels from a set of scan data;

asymmetrically regularize at least some of the plurality of voxels, wherein the asymmetric regularization of each respective voxel is based at least in part on adjacent voxels to the respective voxel, wherein less weight is given to adjacent voxels further from a mid-plane of a detector used to acquire the set of scan data, wherein the mid-plane defines the plane in which an X-ray source is rotated about a scan axis; and generate a final image when iterative reconstructing of the plurality of voxels or the set of updated voxels is determined to be complete.

* * * * *